United States Patent [19]
Zimmerer et al.

[11] 3,851,659
[45] Dec. 3, 1974

[54] MEANS FOR ROTATABLY SUPPORTING AN OVERHEAD IRRIGATION PIPE

[75] Inventors: Arthur L. Zimmerer; Bernard J. Zimmerer; Paul B. Zimmerer, all of Lindsay, Nebr.

[73] Assignee: Lindsay Manufacturing Co., Lindsay, Nebr.

[22] Filed: Dec. 21, 1970

[21] Appl. No.: 100,156

[52] U.S. Cl. ............................................. 137/344
[51] Int. Cl. ........................ A01g 25/02, B05b 3/12
[58] Field of Search ............ 137/344; 239/212, 213

[56] References Cited
UNITED STATES PATENTS

| 2,665,941 | 1/1954 | Idler | 239/212 X |
| 3,202,172 | 8/1965 | Bergeron et al. | 137/344 |
| 3,259,319 | 7/1966 | Wallace | 239/212 X |
| 3,314,608 | 4/1967 | Curtis et al. | 137/344 X |
| 3,360,200 | 12/1967 | Purtell | 137/344 X |
| 3,370,606 | 2/1968 | Kane | 137/344 |
| 3,379,378 | 4/1968 | Kern | 239/212 |
| 3,381,894 | 5/1968 | Purtell | 137/344 X |
| 3,533,557 | 10/1970 | Ingram et al. | 239/212 |
| 3,562,994 | 2/1971 | Linsowe | 239/212 X |

Primary Examiner—Henry T. Klinksiek
Attorney, Agent, or Firm—Kinzer, Plyer, Dorn & McEachran

[57] ABSTRACT

A means for rotatably supporting an overhead irrigation pipe comprising a sleeve means secured to the upper end of a self-propelled irrigation tower which freely rotatably receives the irrigation pipe extending therethrough. The rotatable connection between the tower and the irrigation pipe permits the tower to traverse irregular terrain without imposing twist stress in the pipe.

2 Claims, 5 Drawing Figures

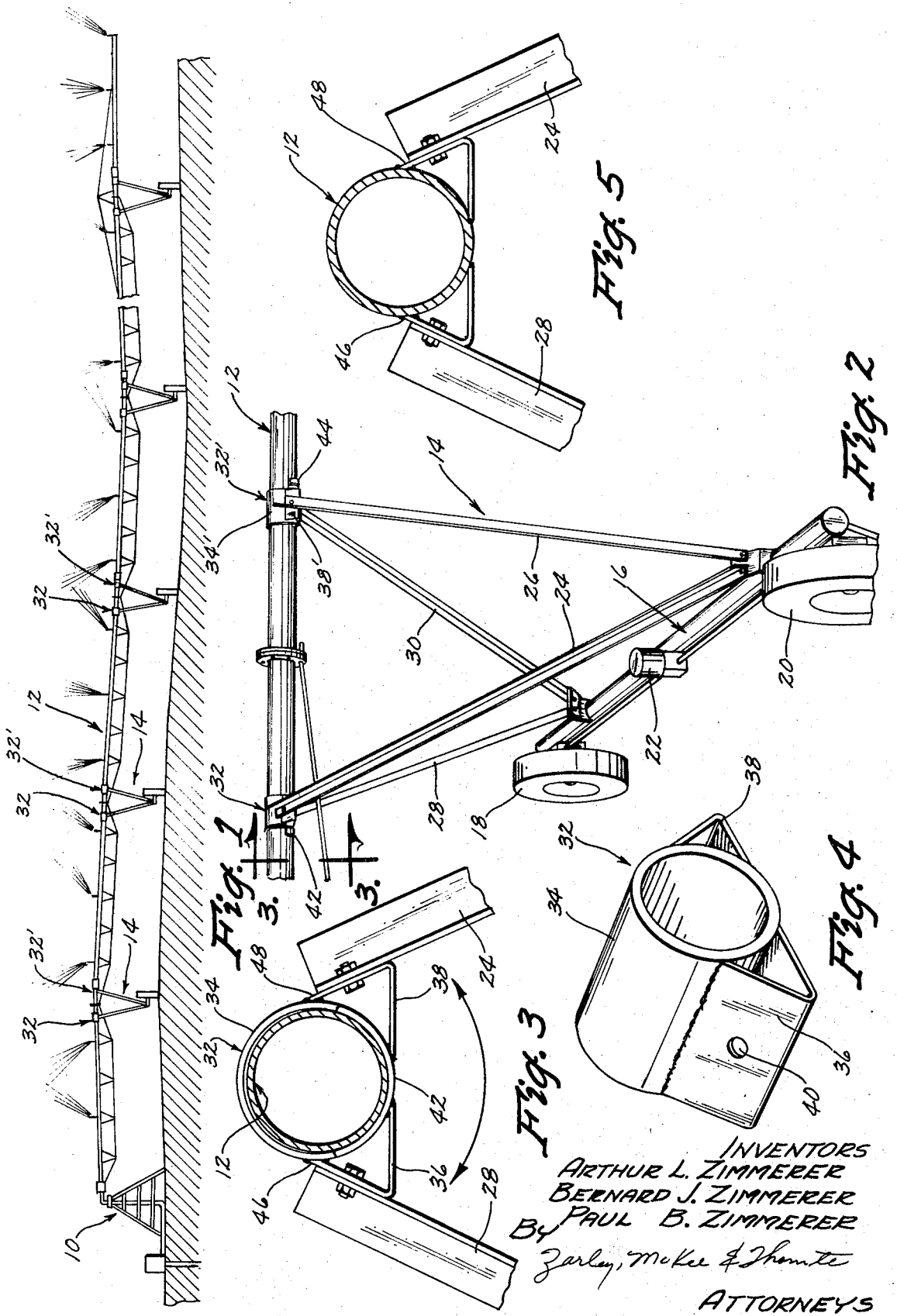

MEANS FOR ROTATABLY SUPPORTING AN OVERHEAD IRRIGATION PIPE

In self-propelled irrigation systems, a plurality of spaced apart self-propelled towers are disposed along the length of the irrigation pipe and are used to move the pipe over a predetermined path. Unless the terrain is level, the towers will impose twist stress in the pipe as they traverse the terrain. Thus, the conventional systems are only used on fairly level ground since the irrigation pipe would be broken if the system were used on irregular terrain. The stress imposed in the irrigation pipe can be extremely great if adjacent towers are traversing uphill and downhill grades respectively.

Therefore, it is a principal object of this invention to provide a means for supporting an overhead irrigation pipe which prevents twist stress from being imposed in the pipe.

A further object of this invention is to provide a means for rotatably supporting an overhead irrigation pipe.

A further object of this invention is to provide a means for rotatably supporting an overhead irrigation pipe which permits the self-propelled towers to freely rotate with respect to the irrigation pipe.

A further object of this invention is to provide a means for rotatably supporting an overhead irrigation pipe which is durable in use.

A further object of this invention is to provide a means for rotatably supporting an overhead irrigation pipe wherein at least some of the towers are rigidly secured to the irrigation pipe while the remaining towers are rotatably secured to the irrigation pipe.

A further object of this invention is to provide a means for rotatably supporting an overhead irrigation pipe which permits the irrigation pipe to be moved along a predetermined path even if the terrain is irregular.

A further object of this invention is to provide a means for rotatably supporting an overhead irrigation pipe which is economical of manufacture and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a side view of a typical self-propelled irrigation system employing the invention herein;

FIG. 2 is a perspective view of one of the towers which is rotatably connected to the irrigation pipe;

FIG. 3 is a sectional view seen along lines 3—3 of FIG. 2;

FIG. 4 is a perspective view of the device of this invention; and

FIG. 5 is a sectional view illustrating the means by which certain of the towers are rigidly connected to the irrigation pipe.

In FIG. 1, the numeral 10 generally refers to a pivot assembly of conventional design about which the overhead irrigation pipe 12 pivots. A pump means is also provided adjacent the pivot assembly 10 to supply water to the interior of the irrigation pipe 12. The pipe 12 is supported by a plurality of self-propelled towers 14 along the length thereof which are adapted to propel the pipe 12 around the pivot assembly 10 in conventional fashion.

FIG. 2 illustrates the means by which one of the towers 14 is connected to the pipe 12. In FIG. 2, the numeral 16 refers to a drive frame having a pair of wheels 18 and 20 rotatably mounted at the opposite ends thereof. A gear motor 22 is mounted on the drive frame 16 and is operatively connected to the wheels 18 and 20 for rotatably driving the same. Motor 22 is electrically connected to a source of electrical power in conventional fashion. Angles 24 and 26 are bolted at their lower ends to drive frame 16 adjacent wheel 20 and extend upwardly towards the pipe 12 in a diverging fashion. Similarly, angles 28 and 30 are bolted at their lower ends to the other end of drive frame 16 and extend upwardly towards the pipe 12 in a diverging manner. It can be seen that angles 24 and 28 converge towards each other and that angles 26 and 30 also converge towards each other.

Rotary sleeve means 32 is secured to the upper ends of angles 24 and 28 and rotatably embraces the pipe 12. A rotary sleeve means 32' is secured to the upper ends of angles 26 and 30 and rotatably embraces the pipe 12 in a spaced relationship with respect to sleeve means 32. Since sleeve means 32 and 32' are identical, only sleeve means 32 will be described in detail with " ' " indicating identical structure on sleeve means 32'.

The sleeve means 32 is best seen in FIG. 4 and comprises generally a sleeve member 34 having V-shaped clips 36 and 38 secured thereto. Sleeve member 34 rotatably embraces the pipe 12 and preferably has an inside diameter which is three-eighth inch greater than the outside diameter of the irrigation pipe 12. The clips 36 and 38 are welded to the sleeve member 34 and have bolt openings 40 formed therein adapted to receive a bolt extending therethrough to effect the connection between the upper ends of the angles 24 and 28 thereto. Likewise, angles 26 and 30 are secured to the sleeve means 32' so that the tower 14 can rotate about the longitudinal axis of irrigation pipe 12 without imposing twist stress in the pipe. Stop members 42 and 44 are welded to the pipe 12 outwardly of the sleeve means 32 and 32' respectively to prevent longitudinal movement of the tower with respect to the pipe 12.

The rotatably connection of the towers 14 with respect to the irrigation pipe 12 permits the towers to traverse irregular terrain without imposing twist stress in the pipe as previously stated. This feature is extremely important since adjacent towers could be traversing uphill and downhill grades respectively which could cause breakage of the irrigation pipe if the rotatable connections were not provided. Thus, the system can be employed on irregular fields which heretofore could not be irrigated by overhead irrigation pipe systems such as that disclosed herein. It is also recommended that a "Uni-Knuckle" joint such as manufactured by Lindsay Manufacturing Co., Lindsay, Nebraska be also employed in the system to permit the irrigation pipe to freely vertically move with respect to the central pivot assembly. It is also recommended that certain of the towers 14 be rigidly secured at their upper ends to the pipe 12 such as illustrated in FIG. 5 wherein a pair of clips 46 and 48 are welded to the pipe 12 itself and are secured to the upper ends of tower angles by means of bolts or the like. In a system employing 10 spaced apart towers, it is recommended that towers 4, 7 and 10 be rigidly secured to the irrigation pipe to prevent the system from collapsing. In other words, if all of the towers in the system were rotatably connected to the pipe 12, it is conceivable that all of the towers could rotate with respect to the pipe 12 in a manner which would cause the pipe to fall to the ground. Therefore, it is recommended that at least some of the towers be rigidly secured to the pipe 12 to prevent such an occurrence. FIG. 1 illustrates towers 4 and 10 being rigidly connected to the pipe 12 in the manner shown in FIG. 5.

Thus it can be seen that the invention accomplishes at least all of its stated results.

We claim:

1. A self-propelled irrigation system comprising, a water distribution pipe movable along a predetermined path, means for supplying water to said pipe, a plurality of spaced apart, self-propelled towers along the length of said pipe for supporting said pipe above the ground and to propel said pipe along said predetermined path, at least some of said towers having a sleeve means thereon through which said pipe freely rotatably extends to permit said towers to traverse irregular ground without imposing twist stress in said pipe, at least some of said towers being rigidly connected to said pipe so as to prevent rotational movement of those said towers with respect to said pipe.

2. In combination, a self-propelled irrigation tower means, and an irrigation pipe freely rotatably connected to said tower means about the longitudinal axis of said pipe so that said tower can transverse irregular terrain without imposing twist stress in said pipe, said tower means comprising a wheeled frame means having at least first and second spaced apart frame members secured to said frame means and extending upwardly therefrom in a converging manner, a sleeve means secured to the upper ends of said first and second frame members, said pipe rotatably extending through said sleeve means, said sleeve means comprising a sleeve member having first and second V-shaped supports secured thereto at opposite sides thereof, said first and second V-shaped supports being secured to the upper ends of said first and second frame members.

* * * * *